United States Patent [19]
Hoppe

[11] Patent Number: 4,750,997
[45] Date of Patent: Jun. 14, 1988

[54] GRAIN CLEANER AND SPREADER

[76] Inventor: Gerald W. Hoppe, P.O. Box 157, St. Clair, Minn. 56080

[21] Appl. No.: 62,143

[22] Filed: Jun. 15, 1987

[51] Int. Cl.$^4$ .......................... B07B 1/00; B65G 69/12
[52] U.S. Cl. ...................................... 209/236; 209/240; 209/254; 209/257; 209/281; 414/291
[58] Field of Search ............... 209/235, 236, 240, 247, 209/254, 255, 257, 274, 281, 415, 629, 634, 643, 680, 682, 23, 27, 31, 35; 414/291; 406/121

[56] References Cited

U.S. PATENT DOCUMENTS

| | | | |
|---|---|---|---|
| 744,390 | 11/1903 | Osborne et al. | 209/281 X |
| 1,229,542 | 6/1917 | Stewart et al. | 209/281 X |
| 1,242,318 | 10/1917 | Brest | 209/281 |
| 3,361,258 | 1/1968 | Kalke | 209/240 X |
| 3,370,705 | 2/1968 | Grulke | 209/240 |
| 3,883,011 | 5/1975 | Pennell | 414/291 |
| 4,323,160 | 4/1982 | Cowgill | 209/235 X |
| 4,549,960 | 10/1985 | Hoppe | 209/255 X |

FOREIGN PATENT DOCUMENTS

| | | | |
|---|---|---|---|
| 0212940 | 8/1984 | Fed. Rep. of Germany | 414/291 |

*Primary Examiner*—Johnny D. Cherry
*Assistant Examiner*—Edward M. Wacyra
*Attorney, Agent, or Firm*—Herman H. Bains

[57] ABSTRACT

A portable, collapsible grain cleaner and spreader apparatus is used to evenly spread and clean grain or similar crops as the grain is introduced into a storage structure. The grain cleaner and spreader apparatus comprises a vertically disposed grain receiver which distributes grain to be dried over a frusto-conically shaped perforated screen device. A funnel-shaped body engages the perforated screen device and has a fan assembly connected thereto. Grain is evenly distributed over the screen device into the storage structure. Debris, chaff, bees wings, dirt, and weevils pass through the screen device, funnel-shaped member, and fan assembly and are discharged exteriorly of the storage structure through a conduit.

5 Claims, 1 Drawing Sheet

GRAIN CLEANER AND SPREADER

This invention relates to an apparatus for cleaning and spreading grain, such as corn, soybeans, or the like.

BACKGROUND OF THE INVENTION

After harvesting, grain is stored in various kinds of storage structures, such as storage bins or the like. It is desirable to clean the grain to remove chaff, bees wings, weevils, dirt, debris, and the like at the time the grain is stored.

Certain prior art devices have been developed for cleaning grain, such as in U.S. Pat. No. 4,549,960, which discloses a portable collapsible grain cleaner for mounting in a grain bin. Even though this patented structure performs well as a grain cleaner, it is a relatively large and expensive apparatus.

Russian Pat. No. 939,130 discloses a grain cleaner apparatus having a slightly inclined reciprocating screen through which grain falls and a pneumatic device for removing the larger lighter particles.

U.S. Pat. No. 3,361,258 discloses a grain spreader in which grain is screened exteriorly of the bin, and the grain is spread by a power-driven rotating disk.

U.S. Pat. No. 1,528,983 discloses an apparatus for treating diatomaceous earth, including a reciprocating screen device.

While the aforesaid prior art devices appear to satisfy the specific intended purpose for which they were built, none provide a simple, inexpensive, portable, knockdown grain cleaner and spreader device which may be applied to various types of storage structures.

SUMMARY OF THE INVENTION

It is a general object of this invention to provide a grain cleaner and spreader device, of simple and inexpensive construction, which may be used with various types of storage structures for cleaning and spreading grain, soybeans, and the like.

Another object of this invention is to provide a novel and improved cleaner and spreader device, which may be readily assembled or disassembled, and which may be readily mounted at the upper portion of a storage structure for spreading and cleaning grain.

A more specific object of this invention is to provide a novel grain cleaner and spreading device for cleaning grain, beans, and the like, which includes a perforated frusto-conical screen secured to an imperforate funnel-shaped body, the latter being connected to an evacuation fan so that grain is directed by the perforated screen for uniform distribution and the fan device causes chaff, bees wings, weevils, debris, and the like to be passed through the screen and removed to the exterior.

These and other objects of the invention will be more fully described in the following Specification.

FIGURE OF THE DRAWING

FIG. 1 is a side view, partly in elevation and partly in section, illustrating the novel grain spreading and cleaning apparatus.

DESCRIPTION OF THE PREFERRED EMBODIMENT

Figure 1:
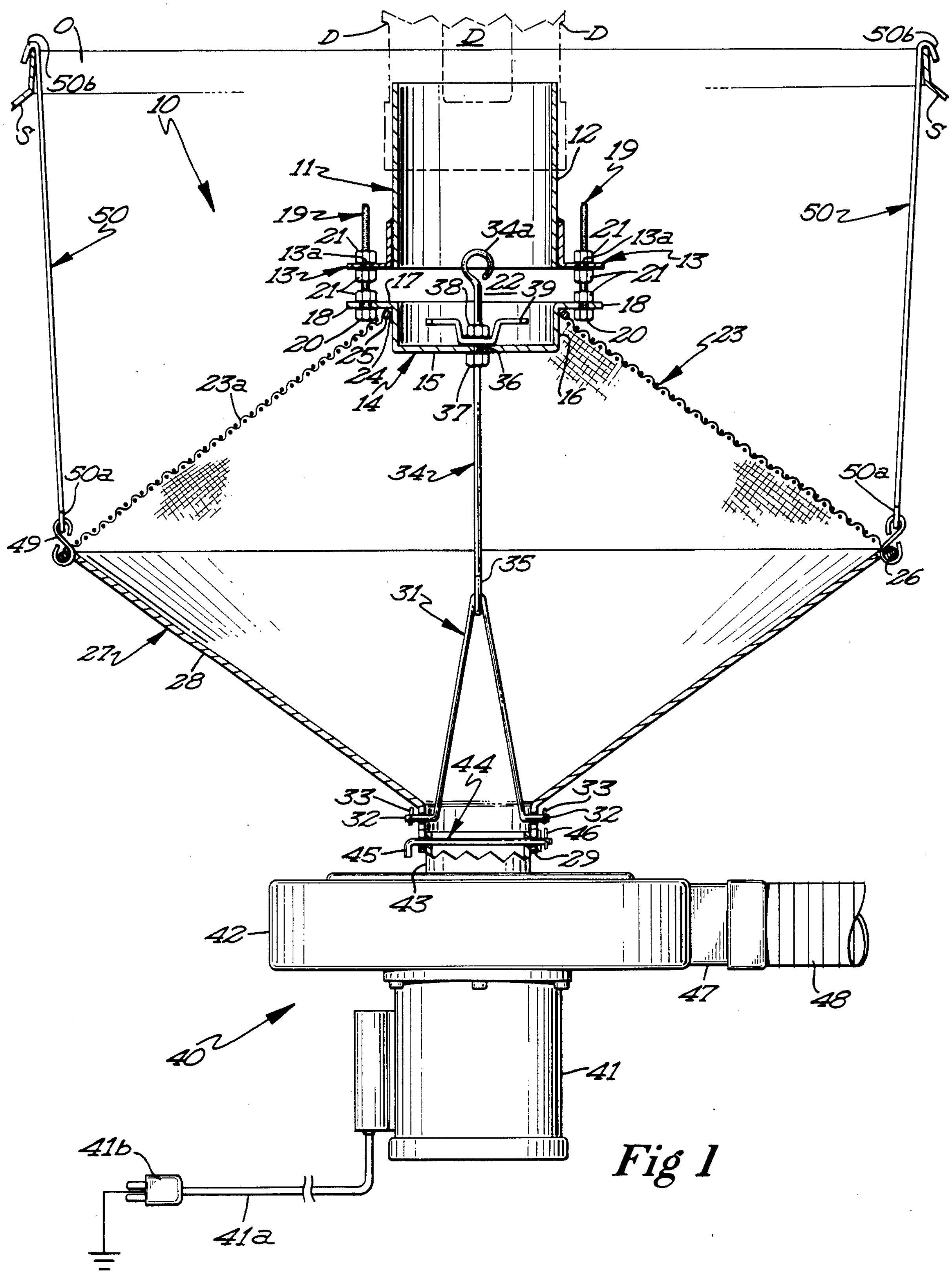

Referring now to the drawings, it will be seen that one embodiment of the novel portable grain cleaning and spreading apparatus, designated generally by the reference numeral 10, is thereshown. The grain cleaning and spreading apparatus is illustrated as being mounted in a conventional storage structure S, at or adjacent the opening O therein, for receiving grain delivered by a grain delivery tube D of an auger conveyor device. It is pointed out that the storage structure may be any conventional storage structure, including storage bins, truck bodies used in the delivery of grain, and similar structures. The grain cleaning and spreading apparatus 10 includes a vertically disposed grain receiver 11, which is adapted to receive grain from the delivery tube D. The grain receiver includes an upper cylindrical member 12, which is provided with L-shaped brackets 13. The horizontal arm 13*a* of each L-shaped bracket 13 is provided with an opening therein.

A grain receiving member or cup 11 is positioned below and in obstructing relation with respect to the upper cylindrical member or tube 12. The cup 14 forms the lower portion of the grain receiver and includes a lower substantially flat wall 15, which is integral with a cylindrical wall 16. It will be noted that the cylindrical wall 16 is disposed in coaxial aligned relation with the upper cylindrical member 12. The cylindrical wall 16 has an outturned radial flange 17 integrally formed therewith.

The outturned flange 17 of the cup 14 is provided with a pair of tabs 18, each having an opening therein, and each tab being positioned below and in alignment with one of the horizontal arms 13*a* of one of the brackets 13. The cup 14 is secured to brackets 13 of the upper cylindrical tube 12. Each bolt 19 has a head 20 and extends through an opening in one of the tabs 18 and through the opening in a horizontal arm of one of the L-shaped brackets 13. A pair of nuts threadedly engage the bolt on opposite sides of the associated horizontal bracket arm 13*a* to secure the cup 14 to the upper cylindrical member 12, but in spaced relation thereto. An annular opening 22 is defined between the lower end of the cylindrical member 12 and the upper end of the cup 14. With this arrangement, it will be seen that grain passing from the delivery tube of the auger conveyor will be delivered into the upper cylindrical member and will eventually be distributed evenly and radially through the annular opening 22.

The grain cleaning and spreading apparatus also includes a frusto-conically shaped screen device 23 including a screen 23*a* having a generally circular opening 24 at the upper end thereof. The upper edge of the frusto-conical screen 23*a* is provided with an upper bead or rim 25, and the lower edge thereof is provided with a lower bead or rim 26. The perforations or openings in the screen are of a size to prevent the corn, soybeans, or similar grain type crops from passing therethrough, but permitting passage of smaller particles therethrough, such as chaff, weevils, bees wings, dirt, debris, and the like.

A rigid imperforate tunnel-shaped body or member 27 engages the frusto-conical screen device 23 and extends downwardly therefrom. The funnel-shaped body includes an inverted frusto-conically shaped wall 28, which is uniformly and downwardly tapered and terminates in a cylindrical lower end portion 29. The cylindrical lower end portion 29 has a diametrically opposed upper pair of openings 30 therein, which accommodates the outturned end portions 32 of an inverted V-shaped hanger 31. The outturned end portions 32 have openings therein for accommodating retainers 33 to prevent accidental disengagement of the inverted V-shaped hanger from the funnel-shaped body 27. The inverted V-shaped hanger 31 projects interiorly of the funnel-shaped body 27 and is engaged by an elongated rod 34. In this regard, the lower end portion of the elongated rod 34 is arcuate or hook-shaped, and this hook-shaped portion engages the apex of the inverted V-shaped hanger 31.

The upper end portion of the rod 34 includes a threaded portion 36, which projects through a centrally located opening in the lower wall 15 of the cup 14. A lower nut 37 engages the lower surface of the wall 15, and an upper nut 38 engages the upper surface of the lower wall. The upper nut is provided with a handle 39, which is slightly upwardly curved to facilitate turning of the nut. It will be noted that the upper end of the rod 34 is arcuately bent to form an eye 34*a*.

A fan assembly 40 is secured to the cylindrical lower end portion 29 of the funnel-shaped body 27. The fan assembly includes an electric motor 41, which is connected to a fan housing 42 of conventional construction. The fan housing has a bladed fan therein, which is connected to the output shaft of the electric motor. The fan housing 42 is provided with an upwardly open cylindrical inlet opening 43, which telescopes within the lower cylindrical portion 29 of the funnel-shaped body 27. A locking pin 44 projects through registering openings in the cylindrical lower end portion 29 and the cylindrical inlet opening 43 of the fan housing 42 to secure the fan housing to the funnel-shaped body 27. The locking pin 44 has an offset end portion 45 at one end thereof, and the other end thereof is provided with an opening for accommodating a retainer 46 therethrough, such as a cotter pin or the like.

The fan housing 42 is also provided with a cylindrical outlet 47, which, in the embodiment shown, is horizontally disposed and is connected to one end of an elongate discharge conduit 48. Although not shown in the drawings, the other end of the discharge conduit will extend through an opening in the storage structure S to discharge material falling through the perforate screen device 23 to the exterior. The electric motor 41 will be provided with a suitable double wire electrical cord 41*a* having a suitable bayonette type connector 41*b* at its end for connection to a suitable source of electrical current.

It will be noted that a pair of S-shaped hooks 49 extend through perforations in the frusto-conical screen device 23 to engage the lower rim 26 thereof. These S-shaped hooks 49 are preferably positioned in diametrically opposed relation to each other, and each engages the lower hooked end 50*a* of an elongate hanger rod 50. The upper end of each hanger rod 50 is arcuately bent, as at 50*b*, and engages the upper edge of the storage structure S, which defines the opening therein. With this arrangement, it will be seen that the cleaning apparatus is suspended from the upper edges defining the opening in the storage structure so that the cleaning and spreading apparatus may be readily placed in position or removed therefrom.

In use, grain will be fed into the grain receiver 11 by the auger conveyor delivery tube D so that the grain will first fill the cup 14 and will then be radially discharged uniformly over the frusto-conically shaped screen device 23. The fan assembly 40 will be energized so that a vacuum pressure will be exerted on the screen to pull the unwanted trash and fine material through the screen into the imperforate inverted funnel-shaped body 27 and thereafter through the fan housing for discharge through the discharge conduit 48.

When the grain cleaning and spreading apparatus 10 is removed from a storage structure, the apparatus may be readily disassembled for storage in an area of small compass. In this regard, the upper nut 38 may be loosened by turning the handle 39, and the rod 34 may be disengaged from the inverted V-shaped hanger 31 to permit the screen device 23 and grain receiver 11 to be disengaged from the funnel-shaped body 27 and the fan assembly 40. It will be appreciated that the fan assembly may be disengaged from the funnel-shaped body by removing the retainer and thereafter removing the locking pin 44 from its interlocked relation with respect to the lower cylindrical portion 29 of the funnel-shaped body and the inlet opening of the fan assembly.

The grain receiver 11 may be readily removed from the frusto-conically shaped screen device 23 by disengaging the nuts 21. Thus, it will be seen that the principal parts of the grain cleaning and spreading apparatus may be readily disengaged so that the parts may be packaged in a relatively small compact package.

It is further pointed out that the cleaning and spreading apparatus may be positioned upon the inlet opening of a truck to permit cleaning of the grain as it is being introduced into the truck. In this respect, the funnel-shaped body 27 may be positioned upon the opening so that a portion of the funnel-shaped body rests upon the edge portion defining the opening. The fan assembly will be first assembled with the inverted funnel-shaped body and the perforate screen device 23 and grain receiver 11 will thereafter be assembled and interconnected with the funnel-shaped body.

From the foregoing, it will be seen that I have provided a novel and improved grain cleaning and spreading apparatus which effectively cleans and uniformly spreads grain into various kinds of storage structures. It will further be seen that my novel grain cleaning and spreading apparatus may be readily assembled and disassembled and requires no special tools.

Thus, it will be seen that I have provided a novel portable grain cleaning and spreading apparatus, which is of simple and inexpensive construction, and which functions in a more efficient manner than any heretofore known comparable structure.

What is claimed is:

1. Apparatus for cleaning and spreading particulate crops, such as beans, grain, or the like, delivered to a storage structure having an opening in an upper portion thereof, comprising:

a grain receiving device positioned adjacent the opening in the storage structure for receiving grain to be cleaned and stored, said grain receiving device including a vertically disposed cylindrical member, receiver means secured to and spaced below said cylindrical member and being disposed in obstructing relation with respect to the latter so that grain is directed radially outwardly therefrom, a frusto-conically shaped perforate screen device having perforations therein of a size to permit grain to pass thereover, but permitting other small material to pass therethrough, said screen device having an upper annular rim engaging said receiver means and flaring downwardly and outwardly therefrom and terminating in a lower annular rim, an imperforate funnel-shaped member having an upper annular edge engaging the lower annular rim of said screen device, said funnel-shaped member tapering downwardly and inwardly to a lower end portion, means connected to said funnel-shaped member and said receiver means releasably clamping the receiver means, frusto-conical screen device, and funnel-shaped member together, a fan assembly including a fan housing having an inlet and an outlet, means releasably securing the inlet of the fan assembly to the lower end portion of said funnel-shaped member in communicating relation therewith, an elongate discharge conduit having one end thereof connected in communicating relation to the outlet of the fan assembly housing and having the other end thereof connected to the exterior of said storage structure, whereby, when grain is directed into said grain receiving-device, and said fan assembly is operated, grain will be spread uniformly by said screen device and lightweight material will be pulled through the perforations in the screen and will be discharged exteriorly of the storage structure.

2. The apparatus as defined in claim 1 wherein said receiver means comprises a cup-shaped member.

3. The apparatus as defined in claim 1 wherein said funnel-shaped member has a cylindrically shaped lower end portion.

4. The apparatus as defined in claim 1 and means engaging said screen device and adapted to engage the storage structure to releasably secure the grain cleaning and spreading apparatus to the latter.

5. The apparatus as defined in claim 1 wherein said means connecting said funnel-shaped member, said frusto-conical screen device and said receiver means comprises a pair of inter-engaging elongate connecting elements.

* * * * *